Patented Apr. 15, 1924.

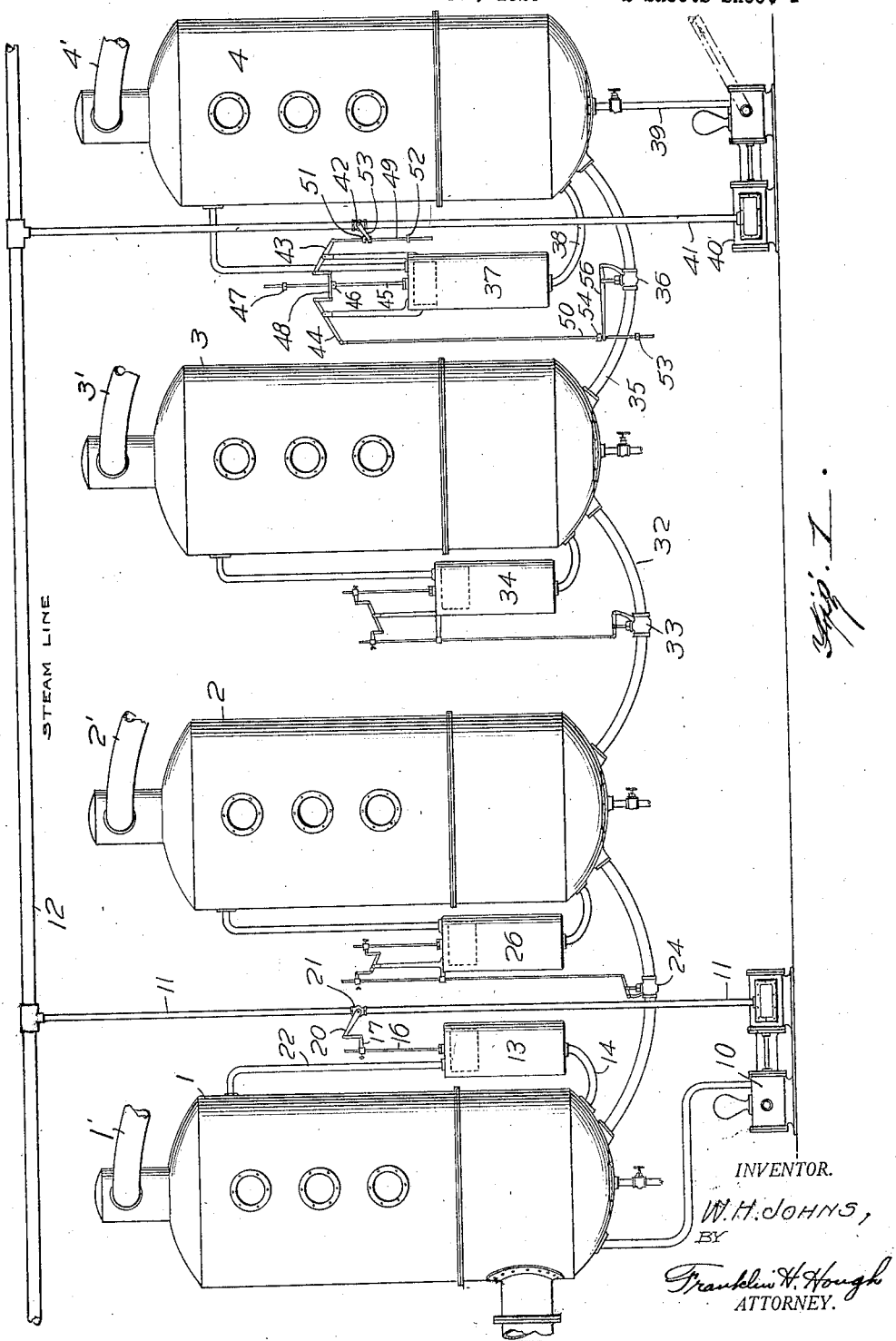

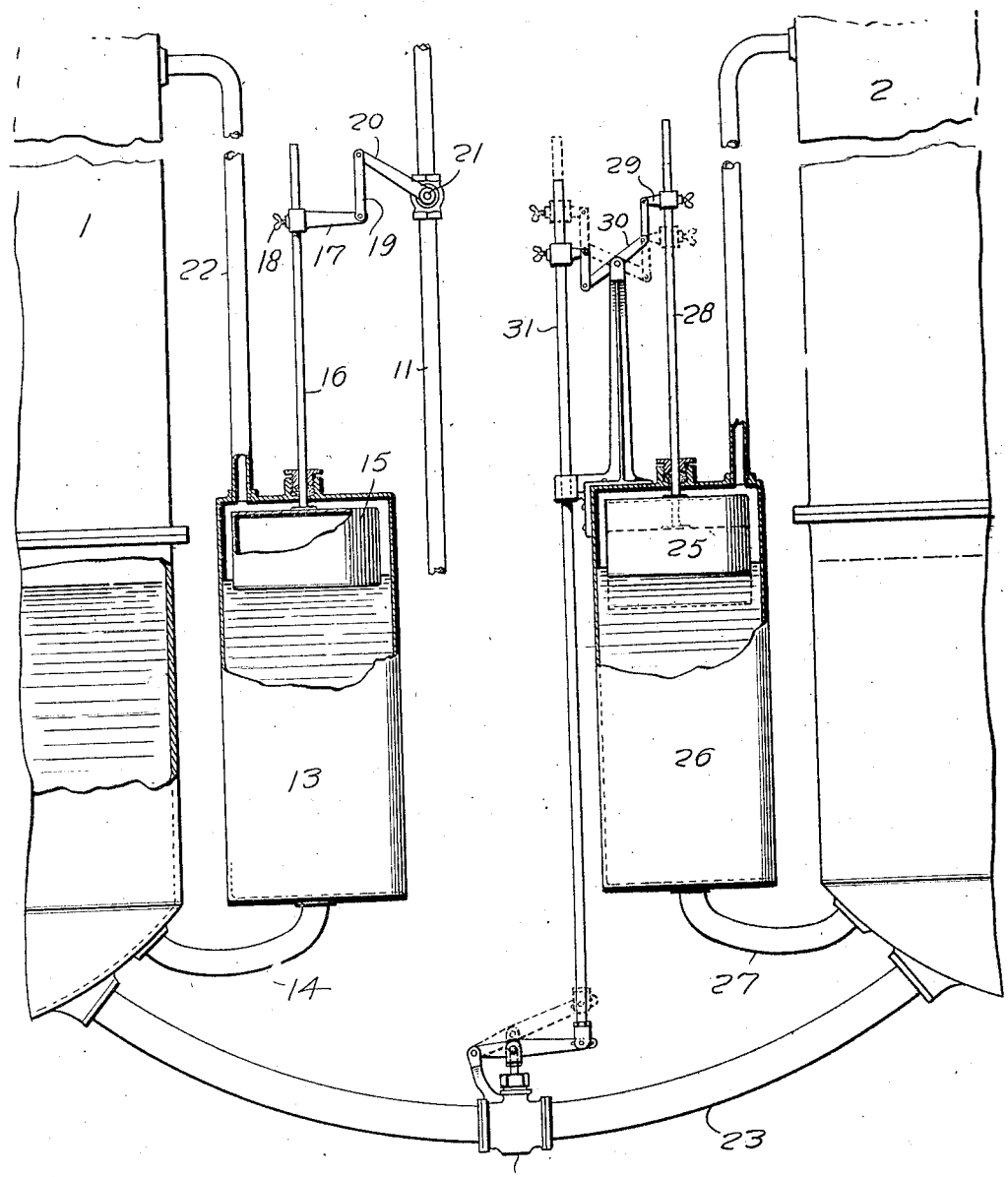

1,490,743

UNITED STATES PATENT OFFICE.

WILLIAM HENRY JOHNS, OF KINGSPORT, TENNESSEE.

VACUUM EVAPORATION APPARATUS.

Application filed November 15, 1920. Serial No. 424,181.

*To all whom it may concern:*

Be it known that I, WILLIAM H. JOHNS, a citizen of the United States, residing at Kingsport, in the county of Sullivan and State of Tennessee, have invented certain new and useful Improvements in Vacuum Evaporation Apparatus, of which the following is a specification, reference being had therein to the accompanying drawings.

This invention relates to automatic control for vacuum pans and the like, and has for an object to provide improved means for maintaining the desired height of liquid within the pans for operation, irrespective of the vacuum in each pan, which may vary as circumstances may require.

A further object of the invention is to provide improved means whereby the last effect may be wholly emptied of the contents without producing any result in the preceding effects until such emptying has been accomplished, whereupon the last, or finishing effect, will be automatically filled from the preceding effects.

With these and other objects in view, the invention comprises certain novel features, units, elements, functions, combinations, connections and operating parts, as will be hereinafter more fully described and claimed.

In the drawings:

Figure 1 is a view more or less conventional of a complete installation of four effects and their connections; and Figure 2 is a detail enlarged view of a portion of said installation.

Like characters of reference indicate corresponding parts throughout the several views.

In the drawing the several effects, here shown as four in number, have been correspondingly numbered. These effects are vacuum pans, or like structures, of usual and ordinary type, in which the liquid being operated upon is maintained, or should be maintained, at constant level irrespective of the vacuum in said pan. It is well known that the vacuum in the several effects, increases from the first to the last effect and the result ordinarily is that the said vacuum draws the said liquid from the first effect to the second and so on to the last effect unless some means is provided for controlling the fall. Under ordinary conditions this controlling means is wholly manual and the level obtained in the several effects is subject to manual attention. The present invention provides wholly automatic means for controlling the flow from one effect to the next in series, whereby the requisite liquid level is maintained.

As shown at Figure 1, the first effect is connected with the supply line through the feed pump 10, controlled from the pipe 11 and steam line 12. The liquid level in effect 1 is maintained by the liquid introduced by the pump 10. This is controlled by means of a float tank 13 in communication with effect 1 through pipe 14. Within the float tank 13 the float 15 is provided having a stem 16 upon which an arm 17 is adjustable by means of the set screw 18. The arm 17, through the link 19 and lever 20 controls a valve 21 by which steam is admitted to the pump 10 for starting and stopping the pump to fill the first effect. As the liquid level in the first effect rises and falls the liquid in the float tank 13 maintains a similar level by reason of a vent pipe 22 communicating with the top of said effect. The rise and fall of the float 15 opens and closes the valve 21 to start and stop the pump to fill the first effect.

Extending between the first and second effects is a transfer pipe 23 having a valve 24 for controlling the flow through said transfer pipe. The several effects are under vacuum through their several pipes 1', 2', 3' and 4' respectively, the vacuum increasing, of course, in the usual well known manner. The maintaining of the higher vacuum in the effect 2 results in drawing material from the effect 1 through the transfer pipe 23 into the effect 2 when the valve 24 is open. The valve 24 is controlled by means of a float 25 in the float tank 26, which communicates with the effect 2 by means of the pipe 27. The float 25 is provided with a stem 28 having an adjustable arm 29 actuating a walking beam 30. The walking beam 30 connects adjustably with the link 31 which controls the valve 24. As the liquid level in effect 2 rises and falls, the float 25 responds thereto, opening and closing the valve, the opening taking place when the liquid level in effect 2 falls below the desired height. The opening of this valve 24 and the excess vacuum in effect 2 causes the inflow of material from the effect 1 to the effect 2 until the desired liquid level has been obtained, when the valve 24 is automatically closed, discontinuing the inflow through the pipe 23. The withdrawal of liquid from effect 1 to fill effect 2, lowering the level therein will cause the starting of the pump to raise the level in effect 1, as hereinafter described. Between effects 2 and 3 a transfer pipe 32 is controlled by a valve 33 and float tank 34, the same as described in regard to the float tank 26 and valve 24. Also between the effects 3 and 4 a transfer pipe 35 is controlled by a valve 36. The float tank 37 communicating with the effect 4 through the pipe 38, however, performs double function. The effect 4 is discharged through the pipe 39 and pump 40, which pump is controlled by steam through the pipe 41 from the steam line 12. The passage of steam through the pipe 41 is controlled by the valve 42, which is, in turn, controlled by the walking beam 43. The valve 36 is controlled by a walking beam 44 and both these walking beams are controlled by the stem 45 from the float in float tank 37. As it is desirable to completely empty the fourth effect before admitting fluid from the third effect, the float stem 45 does not actuate the members as in the other effects. The stem 45 is provided with spaced collars 46 and 47, actuating a cross-head 48 only when the float within the tank 37 has fallen or risen to such a point that the collars engage said cross-head. The cross head 48 rocks the walking beams 43 and 44 respectively, which in turn actuate links 49 and 50. The link 49 is provided with spaced collars 51 and 52 which engage the lever 53 of the valve 42, whereas the link 50 is provided with spaced collars 54 and 55 which engage the lever 56 of the valve 36.

The operation of the device is as follows: The first effect is filled by the pump 10 actuated by steam from the line 12 until the desired liquid level has been obtained within such effect. Assuming the second effect to be empty, the valve 24 will be opened and the material from the first effect will flow into the second effect until the valve 24 is closed. In the usual operation of the device all of the effects are normally filled to the required liquid level, but as the liquid level is lowered by evaporation the valve feeding such effect is automatically opened admitting liquid from the prior effect. As the vacuum in each effect is greater than the vacuum in the preceding effect it will draw the fluid through so that to and including the filling of the fourth effect the action is wholly automatic. It is intended that substantially the required degree of concentration shall take place in the first, second and third effects and that the concentrate shall enter the fourth effect in very nearly its concentrated condition and that the fourth effect shall act largely as a trap for discharging the material from the battery of effects, although it is obvious that a certain amount of evaporation will also take place in the fourth effect. The concentrate from the third effect will pass through the pipe 35 and the valve 36 into the fourth effect, and by raising the level in such effect and the connection of the cylinder 37 therewith will raise the float in the cylinder 37 until the stop 46 upon the rod 45 engages the cross-head 48 and tilts the walking-beam 44 to such an extent that the collar 54 of the rod 50 will actuate the lever 56 to close the valve 36. The upward movement of the cross-head 48 also tilts the walking-beam 43 and until the collar 51 engages the lever 53 to such an extent as to open the valve 42, the opening of the valve 42 being intended to be substantially simultaneous with the closing of the valve 36, the opening of the valve 42 supplies motive power to the cylinder 40 to actuate the pump to withdraw the contents from the fourth effect.

As the contents is being withdrawn, the float of the cylinder 37 falls until the collar 47 engages the cross-head 48 and the continued fall tilts the walking-beams 43 and 44, lifting the rods 49 and 50. This lifting is continued until the collars 52 and 55 respectively engage the levers 53 and 56, whereupon the valve 42 is closed and the valve 36 opened. The rarification in the fourth effect being greater than the third effect, the material in the third effect is thereby drawn through the pipe 35 and the action is intermittently repeated.

The collars 46, 47, 51, 52, 54 and 55 are all made adjustable upon their separate rods so that they may be timed to operate exactly in unison or at such different intervals, either individually or in unison as may be found desirable. The adjustment of the collars upon the rods 49 and 50 is only auxiliary to the adjustment of the collars upon the rod 45. Each effect is dependent for its action upon the subsequent effect, whereby the first effect is constantly filled by the pump 10, and the fourth effect emptied by the pump 40, the intermediate effects being automatically filled to the requisite level by the rise and fall of their respective floats and the valve constructions operated thereby.

What I claim to be new is:

1. A vacuum evaporation installation comprising a plurality of units, a conduit connecting the last unit with the preceding unit, a valve introduced into the said conduit, a float housing communicating with said last unit, a float mounted to rise and fall within the housing, a pump arranged to withdraw material from said last unit, a steam pipe connected with said pump, a valve introduced into said steam pipe, and means connected with the float tending to operate said valves, so arranged as to synchronously open the steam valve and close the conduit valve when the float is substantially at its upper limit and reversely substantially at its lower limit.

2. A vacuum evaporation installation comprising a plurality of units, a conduit connecting the last unit with the preceding unit, a valve introduced into the said conduit, a float housing communicating with said last unit, a float mounted to rise and fall within the housing, a pump arranged to withdraw material from said last unit, a steam pipe connected with said pump, a valve introduced into said steam pipe, means connected with the float tending to operate said valves, so arranged as to synchronously open the steam valve and close the conduit valve when the float is substantially at its upper limit and reversely substantially at its lower limit, and means to vary the said limits.

3. A vacuum evaporation installation comprising a plurality of units, a conduit connecting the last unit with the preceding unit, a valve introduced into the said conduit, a float housing communicating with said last unit, a float mounted to rise and fall within the housing, a pump arranged to withdraw material from said last unit, a steam pipe connected with said pump, a valve introduced into said steam pipe, means connected with the float tending to operate said valves, so arranged as to synchronously open the steam valve and close the conduit valve when the float is substantially at its upper limit and reversely substantially at its lower limit, and means to adjust parts to depart from synchronization in the actuation of said valves.

4. A vacuum evaporation installation comprising a plurality of units, a conduit connecting the last unit with the preceding unit, a valve introduced into the said conduit, a float housing communicating with said last unit, a float mounted to rise and fall within the housing, a pump arranged to withdraw material from said last unit, a steam pipe connected with said pump, a valve introduced into said steam pipe, means connected with the float tending to operate said valves, so arranged as to synchronously open the steam valve and close the conduit valve when the float is substantially at its upper limit and reversely substantially at its lower limit, means to vary the said limits, and means to adjust parts to depart from synchronization in the actuation of said valves.

In testimony whereof I hereunto affix my signature in presence of two witnesses.

WILLIAM HENRY JOHNS.

Witnesses:
W. R. LANE,
W. R. McDANIEL.